(12) United States Patent
Tokizaki et al.

(10) Patent No.: US 9,276,450 B2
(45) Date of Patent: Mar. 1, 2016

(54) WIPER MOTOR

(75) Inventors: Teppei Tokizaki, Kiryu (JP); Shigeki Ota, Kiryu (JP); Kenji Yasumoto, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 240 days.

(21) Appl. No.: 13/819,811

(22) PCT Filed: Aug. 25, 2011

(86) PCT No.: PCT/JP2011/069197
§ 371 (c)(1),
(2), (4) Date: Feb. 28, 2013

(87) PCT Pub. No.: WO2012/029634
PCT Pub. Date: Mar. 8, 2012

(65) Prior Publication Data
US 2013/0169089 A1 Jul. 4, 2013

(30) Foreign Application Priority Data
Sep. 2, 2010 (JP) .................................. 2010-196537

(51) Int. Cl.
*H02K 7/116* (2006.01)
*B60S 1/16* (2006.01)
(Continued)

(52) U.S. Cl.
CPC .................. *H02K 7/116* (2013.01); *B60S 1/166* (2013.01); *B60S 1/26* (2013.01); *B60S 1/583* (2013.01)

(58) Field of Classification Search
CPC ..... H02K 7/116; H02K 7/1166; H02K 5/225; B60S 1/0486; B60S 1/3801; B60S 1/045; B60S 1/66; B60S 1/583; B60S 1/26
USPC ................ 310/83, 99, 46; 15/250.01; 74/425; 192/148, 139
See application file for complete search history.

(56) References Cited

U.S. PATENT DOCUMENTS 5,566,577 A * 10/1996 Klar .................................. 74/42
7,673,366 B2   3/2010 Yagi et al.
(Continued)

FOREIGN PATENT DOCUMENTS

AU    1972045688    *  2/1974
CA       002293218 A1 * 12/1998
(Continued)

OTHER PUBLICATIONS

Machine translation for CN201113662Y.*
(Continued)

*Primary Examiner* — Terrance Kenerly
*Assistant Examiner* — Ahmed Elnakib
(74) *Attorney, Agent, or Firm* — McCormick, Paulding & Huber LLP

(57) ABSTRACT

A wiper motor (10) comprises: a motor body (11) comprising a motor case (13) rotatably supporting an end of the motor shaft (17) in the axial direction thereof; a reduction mechanism (26) reducing the speed of rotation of the motor shaft (17) and transmitting the rotation having the reduced speed to a worm wheel (35); and a motion conversion mechanism (29) converting the rotational motion of the worm wheel (35) into a rocking motion and transmitting the rocking motion to an output shaft (28). The position of the output shaft (28) is set up that the axis (C1) of the output shaft (28) is closer to the motor case (13) than the axis (C2) of the worm wheel (35) and farther from the axis (C2) of the worm wheel (35) than the axis (C) of the motor shaft (17).

6 Claims, 6 Drawing Sheets

(51) Int. Cl.
  *B60S 1/26* (2006.01)
  *B60S 1/58* (2006.01)

(56) References Cited

U.S. PATENT DOCUMENTS

| | | | |
|---|---|---|---|
| 2006/0059646 A1* | 3/2006 | Bendo | 15/250.3 |
| 2006/0060457 A1* | 3/2006 | Bendo | 200/61.54 |
| 2008/0282491 A1* | 11/2008 | Matsumoto et al. | 15/250.13 |

FOREIGN PATENT DOCUMENTS

| | | | |
|---|---|---|---|
| CN | 201113662 Y | * | 9/2008 |
| JP | 2006-94693 A | | 4/2006 |
| JP | 2006-151092 A | | 6/2006 |
| JP | 2007336800 | * | 12/2007 |
| JP | 2010-52617 A | | 3/2010 |
| JP | 2010-75005 A | | 4/2010 |

OTHER PUBLICATIONS

Machine Translation for JP2007336800.*
Copy of dictionary definition of "Wheel".*
PCT Search Report for PCT Serial No. PCT/JP2011/069197 dated Nov. 1, 2011.

* cited by examiner

WIPER MOTOR

CROSS-REFERENCE TO RELATED APPLICATION

This application is entitled to the benefit of and incorporates by reference essential subject matter disclosed in International Patent Application No. PCT/JP2011/069197 filed on Aug. 25, 2011 and Japanese Patent Application No. 2010-196537 filed on Sep. 2, 2010.

TECHNICAL FIELD OF THE INVENTION

The present invention relates to a wiper motor for driving a wiper member mounted on an automobile and so on, particularly, a wiper motor comprising a motion conversion mechanism converting a rotary motion into a swinging motion and transmitting the swinging motion.

BACKGROUND OF THE INVENTION

As a drive source for driving a wiper member, a wiper motor is used in a rear wiper device for wiping a rear window glass mounted on a vehicle such as an automobile. The wiper motor has an electric motor such as a brushed motor and rotatably supported one end to an axial direction of a motor shaft supported by a yoke. A speed reduction mechanism comprising a worm rotated by the motor shaft and a worm wheel meshing with the worm is contained inside a gear case mounted to the yoke. The speed of rotation of the motor shaft is reduced by the speed reduction mechanism and transmitting the rotation to the worm wheel. A motion conversion mechanism converting a rotational motion of the worm wheel into a swinging motion and transmitting the swinging motion to the output shaft is contained in a gear case. The wiper member attached to a distal end of the output shaft is swung back and forth within a predetermined angular range.

Such wiper motors are described, for example, in JP 2006-151092 and JP2006-94693. As a wiper motor, there are a narrow-angle type (link type) with a narrow range of swing of the wiper member and a wide-angle type (differential gear) with a wide range of swing of the wiper member. The motion conversion mechanism mounted on the wiper motor of the narrow-angle type has a pivoting lever fixed to a proximal end of the output shaft, and a connecting rod converting the rotary motion of the worm wheel into the swinging motion and transmitting the swinging motion to the pivoting lever. The connecting rod is rotatably connected to the worm wheel at a position deviating radially from an axial center of the worm wheel and another end of the connecting rod is rotatable connected to the pivoting lever.

On the other hand, the motion conversion mechanism mounted on the wiper motor of the wide-angle type has a pinion gear fixed to the proximal end of the output shaft and a motion conversion member converting the rotary motion of the worm wheel into the swinging motion and transmitting the swinging motion to the pinion gear. One end of the motion conversion member is rotatably connected to the worm wheel at a position deviating radially from an axial center of the worm wheel and another end is a sector gear portion meshing with the pinion gear. A retaining plate swingably connecting the output shaft and a gear shaft set at an axial center of the sector gear portion is set up and retains meshing of the pinion gear and the sector gear portion.

SUMMARY OF THE INVENTION

By the way, when the wiper motor is mounted on a vehicle body, to prevent grease applied to a meshing portion of the speed reduction mechanism from attaching to a commutator of the electric motor, the wiper motor is mounted so that an axial direction of the motor shaft is horizontal to the ground. A through-hole formed in the vehicle body to project the distal end of the output shaft outside the vehicle body is formed at an upper level of the vehicle from a motor mounting position at which the electric motor is mounted. When the wiper motor is set up so that the axial direction of the motor shaft is horizontal, if disposing the output shaft is set up at an upper level in the vehicle to the electric motor as possible, layout properties improves and the wiper motor is easily mounted on the vehicle body. In particular, when the wiper motor of the wide-angle type is used, a distance between the through-hole formed in a window glass and the motor mounting position tends to increase, since the position of the output shaft is not sufficiently separated from an axis of the motor shaft like the wiper motors described in JP 2006-151092 and JP2006-94693, it is difficult to lay out the wiper motor in the vehicle body.

Additionally, in the wiper motors described in JP 2006-151092 and JP2006-94693, the yoke significantly projects to one side in the axial direction of the motor shaft to the position of the output shaft and there is a problem that the layout properties of the wiper motor is not good. That is, when the wiper motor is set up the output shaft positioned in the vehicle body at an upper level to the electric motor, the yoke can significantly project to one side in the horizontal direction to the position of the output shaft, and thus it is difficult to set up the wiper motor in a limited space inside the vehicle body. Therefore, conventionally, when the wiper motor is set up the output shaft positioned in the vehicle at an upper level to the electric motor, two types of gear cases are prepared: a P-type gear case attached the yoke to one side in the horizontal direction to the position of the output shaft; and a Q-type gear case attached the yoke to the other side in the horizontal direction to the position of the output shaft. Therefore, the yoke can be set up either side in the horizontal direction to the position of the output shaft. Due to this, the wiper motor can be arranged in a limited space inside the vehicle by selecting the P-type gear case or the Q-type gear case depending on the type of the vehicle. However, since the two types of gear case need to be prepared, wiper motor productivity decreases and the cost increases.

An object of the present invention is to improve layout properties of the wiper motor.

Another object of the present invention is to reduce the size of the wiper motor.

The wiper motor of the present invention comprises a yoke rotatably supporting one end to an axial direction of a motor shaft; a speed reduction mechanism comprising a worm rotated by the motor shaft and a worm wheel meshing with the worm, reducing the speed of rotation of the motor shaft and transmitting the rotation to the worm wheel; an output shaft extending parallel to an axial direction of the worm wheel of which an axial center is set up at the side of the yoke in the axial direction of the motor shaft than an axial center of the worm wheel and farther from an axis of the motor shaft than the axial center of the worm wheel; and a motion conversion mechanism converting a rotational motion of the worm wheel into a swinging motion and transmitting the swinging motion to the output shaft.

In the wiper motor of the present invention, the output shaft is radially set up outside the worm wheel.

In the wiper motor of the present invention, the axial center of the output shaft is set up on the same side as the axial center of the worm wheel to the axis of the motor shaft.

In the wiper motor of the present invention, the motion conversion mechanism comprises a pinion gear fixed to a proximal end of the output shaft and integrally rotating with the output shaft; a motion conversion member comprising a sector gear portion meshing with the pinion gear and pivotally connected to the worm wheel at a position radially deviating from the axial center of the worm wheel; and a retaining plate swingably connecting a gear shaft set up at an axial center of the sector gear portion and the output shaft.

In the wiper motor of the present invention, the axial center of the output shaft is set up farther from the axis of the motor shaft than an axial center of the gear shaft.

In the wiper motor of the present invention, the axial center of the output shaft is set up nearer to the yoke in the axial direction of the motor shaft than the axial center of the gear shaft.

According to the present invention, since the axial center of the output shaft is set up nearer to the yoke in the axial direction of the motor shaft than the axial center of the worm wheel and farther from the axis of the motor shaft than the axial center of the worm wheel. Therefore, the layout properties of the wiper motor improve and the size of the wiper motor reduces, and thus, the wiper motor is easily mounted in a limited space inside a vehicle and work for mounting the wiper motor improves. Additionally, since two types of gear cases do not need any more, the wiper motor productivity improves and the wiper motor manufacturing cost reduces.

BRIEF DESCRIPTIONS OF THE DRAWINGS

DESCRIPTIONS OF THE PREFERRED EMBODIMENTS

Figure 1:
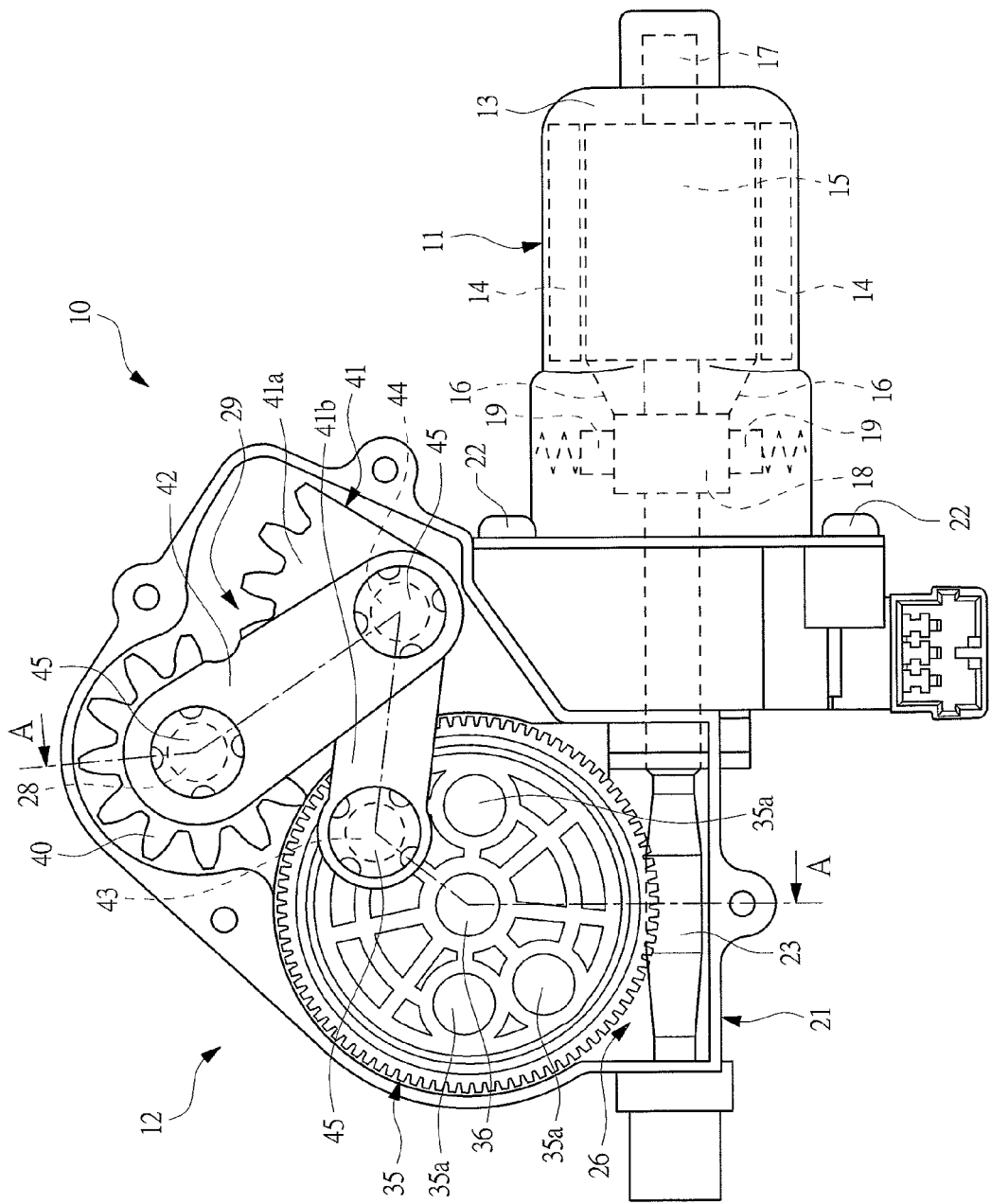
FIG. 1 is a diagram showing a wiper motor of the embodiment of the present invention.

Hereinafter, embodiments of the present invention are described in detail on the basis of drawings. A wiper motor 10 shown in FIG. 1 is used as a drive source of a rear wiper device for wiping a rear window glass mounted on a vehicle such as an automobile. This wiper motor 10 has a motor body (electric motor) 11, and a gear unit portion 12 comprising a motion conversion mechanism converting a rotary motion of the motor body 11 into a swinging motion and transmitting the swinging motion.

The motor body 11 is a brushed DC motor, and comprises a motor case (yoke) 13 formed by pressing a thin steel sheet or the like to a cylinder with a bottom. A plurality of arc-shape permanent magnets 14 magnetized to the N pole and the S pole in a radially inward direction, respectively, face each other and fastened to an inner periphery of motor case 13. An armature 15 facing each permanent magnet 14 via a micro space is rotatably contained inside motor case 13, and a plurality of coils 16 are wound around the armature 15. A motor shaft 17 is fixed by penetrating to a center of rotation of the armature 15.

A cylindrical commutator 18 is fixed to the motor shaft 17 adjacent to the armature 15. An end portion of each coil 16 is electrically connected to the commutator 18. A pair of brushes 19 is in sliding contact with an outer periphery of the commutator 18, respectively. When a drive current is supplied to coils 16 via each brush 19 and the commutator 18, an electromagnetic force torque is generated in the armature 15 in rotational direction, and then, the motor shaft 17 is rotatably driven at a predetermined rotational speed.

A gear frame 21 of the gear unit portion 12 is attached to the motor body 11 on an opening side of the motor case 13. The gear frame 21 is opened to the motor case 13. The gear frame 21 is fixed to the motor case 13 by fastening screws 22 with striking each opening end each other. The motor shaft 17 is inserted inside the gear frame 21 on the other axial end side thereof, and a worm 23 comprising a helical teeth portion is integrally formed with an outer periphery on the other axial end side of the motor shaft 17.

Figure 2:
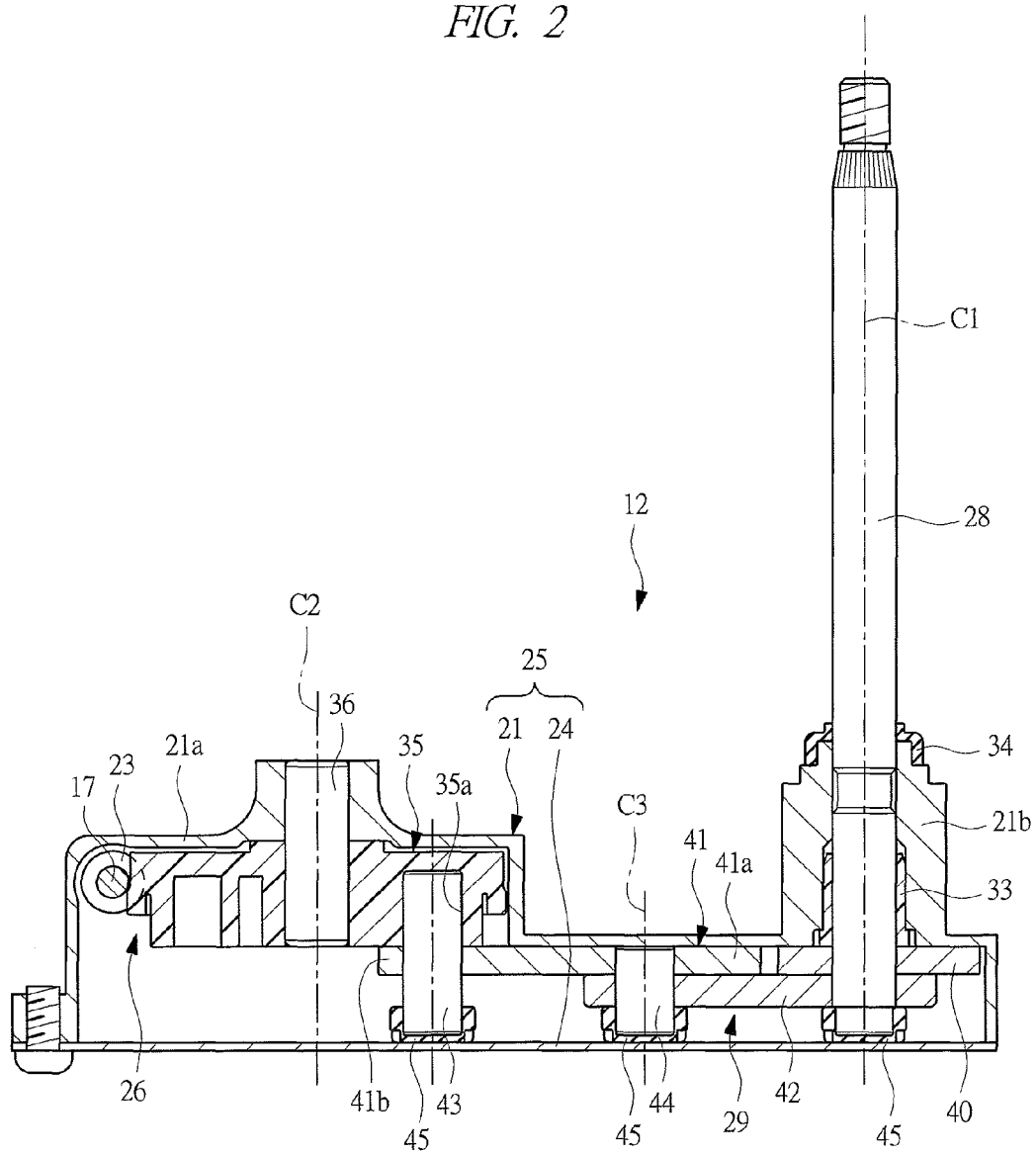
FIG. 2 is a cross-sectional diagram along the line A-A in FIG. 1.

As shown in FIG. 2, the gear frame 21 is formed to bottom-having shape opened in a direction perpendicular to the axial direction of the motor shaft 17 by aluminum die casting. A gear case 25 is formed by the gear frame 21 combined with a gear cover 24 closing the opening. That is, the gear cover 24 is set up at a predetermined distance from a bottom wall 21a of the gear frame 21, and a receiving space is formed between the bottom wall 21a of the gear frame 21 and the gear cover 24. Inside the gear case 21, a speed reduction mechanism 26 reducing the speed of rotation of the motor shaft 17 and transmitting the rotation and a motion conversion mechanism 29 converting a rotational motion of the speed reduction mechanism 26 into a swinging motion and transmitting the swinging motion to an output shaft 28.

FIG. 1 is a diagram of the wiper motor 10 without the gear cover 24 and shows a structure inside the gear frame 21. The gear cover 24 is formed in a predetermined shape by a steel sheet or the like. The wiper motor 10 is fixed to a vehicle body by a bracket portion (not shown) integrated with the gear cover 24. In this embodiment, the gear frame 21 formed so as to have a bottom by aluminum die casting is shown, but not limited, and the gear frame 21 may be formed by resin or other materials.

The output shaft 28 is formed of a round bar made of metal such as steel iron. The axial direction of the output shaft 28 faces an axial direction perpendicular to the axial direction of the motor shaft 17, that is, perpendicular to the bottom wall 21a of the gear frame 21. The output shaft 28 has a proximal end contained in the gear frame 21, a distal end extending outside of the gear frame 21, and is set up so as to pass through the bottom wall 21a of the gear frame 21. A substantially-cylindrical shaft retaining portion 21b projecting outside of the gear frame 21 along an outer periphery of the output shaft 28 is integrally formed at the bottom wall 21a of the gear frame 21. The output shaft 28 is inserted to the shaft retaining portion 21b and rotatably supported by the shaft retaining portion 21b. The distal end of the output shaft 28 projects from the rear window glass outward from the vehicle body, and a wiper member (not shown) for wiping an outer face of the rear window glass is fixed at the distal end of the output shaft 28.

A plastic bearing member 33 is set up between an inner periphery of the shaft retaining portion 21b and the outer periphery of the output shaft 28. The output shaft 28 is rotatably supported on the shaft retaining portion 21b via the shaft bearing member 33. A seal member 34 is attached to a distal end of the shaft retaining portion 21b to prevent rainwater, dusts, and the like from entering the gear frame 21.

The speed reduction mechanism 26 has the worm 23 rotated by the motor body 11 and a worm wheel 35 meshing with the worm 23. The worm wheel 35 is formed into a substantially disk-like shape by injection molding of a resin material, and an outer periphery thereof comprises a teeth portion meshing with the worm 23. A rotary shaft 36 which is fixed to the bottom wall 21a and extends parallel to the output shaft 28 is inserted into an axial center of the worm wheel 35. The worm wheel 35 is rotatably supported on the rotary shaft 36 within the speed reduction mechanism chamber 27. The speed reduction mechanism 26 comprising the worm 23 and the worm wheel 35 reduces the speed of rotation of the motor body 11 and transmits the rotation to the worm wheel 35.

The motion conversion mechanism 29 has a pinion gear 40 fixed on the proximal end of the output shaft 28, a motion conversion member 41 converting a rotary motion of the worm wheel 35 into a swinging motion and transmitting the swinging motion to the pinion gear 40, and a retaining plate 42 swingably connecting the pinion gear 40 and the motion conversion member 41. The motion conversion member 41 comprises a sector gear portion 41a meshing with the pinion gear 40 and an arm portion 41b connected to the worm wheel 35 and is formed to a flat-plate-like shape from a metal material such as a steel sheet.

As shown in FIG. 2, the motion conversion member 41 is set up nearer to the gear cover 24 than the worm wheel 35. A connecting shaft 43 rotatably inserted to any one of a plurality of connecting holes 35c formed in the worm wheel 35 is fixed to an end portion of the arm portion 41b of the motion conversion member 41. That is, the motion conversion member 41 is rotatably connected to the worm wheel 35 by the connecting shaft 43 set up at a position radially deviated from an axial center C2 of the worm wheel 35. The pinion gear 40 is a spur gear and integrally rotated with the output shaft 28 by being fixed to the proximal end of the output shaft 28. The pinion gear 40 is flush with the motion conversion member 41 and meshes with the sector gear portion 41a comprising a substantially-fan-like spur gear, and an end face on the bottom wall 30a thereof is slidably abut to the supporting face 37 of the gear frame 21.

The retaining plate 42 is formed to a flat-plate-like shape by a metal material such as a steel sheet. The retaining plate 42 is set up nearer to the gear cover 24 than the pinion gear 40 and the motion conversion member 41, and extends to between the pinion gear 40 and the sector gear portion 41a. A gear shaft 44 extending parallel to the output shaft 28 or the connecting shaft 43 is rotatably inserted in one end of the retaining plate 42, and the gear shaft 44 is fixed to an axial center of the sector gear portion 41a. On the other hand, the output shaft 28 is rotatably inserted in the other end of the retaining plate 42. The retaining plate 42 swingably connects the gear shaft 44 to the output shaft 28, and retains the meshing state of the pinion gear 40 and the sector gear portion 41a each other.

Due to the motion conversion mechanism 29 with a differential gear structure, when the worm wheel 35 rotates, the connecting shaft 43 fixed to the arm portion 41b of the motion conversion member 41 rotates around the rotary shaft 36 together with the worm wheel 35. Then, the gear shaft 44 fixed to the sector gear portion 41a of the motion conversion member 41 is swung around the output shaft 28, and the output shaft 28 is swung back and forth within a predetermined angular range by meshing between the sector gear portion 41a and the pinion gear 40. That is, a rotary motion of the worm wheel 35 is converted into a swinging motion and transmitted to the output shaft 28 by the motion conversion mechanism 29 and the wiper member is swingably driven within a predetermined swinging range, that is, between a preset stop position and reverse position.

Sliding contact members 45 slidably abut on an inner face of the gear cover 24 are loaded to proximal ends of respective shafts of the output shaft 28, the connecting shaft 43, and the gear shaft 44, respectively. The sliding contact member 45 are formed to a cap-like shape by an elastic member such as rubber, and are incorporated with compressed between the proximal end faces of the respective shafts 28, 43, 44 and the inner face of the gear cover 24. By this elastic force of the sliding contact members 45, the respective shafts 28, 43, 44 are biased axially toward the bottom wall 21a of the gear frame 21, and axial play of each member contained in the gear frame 21 is suppressed.

Figure 3:
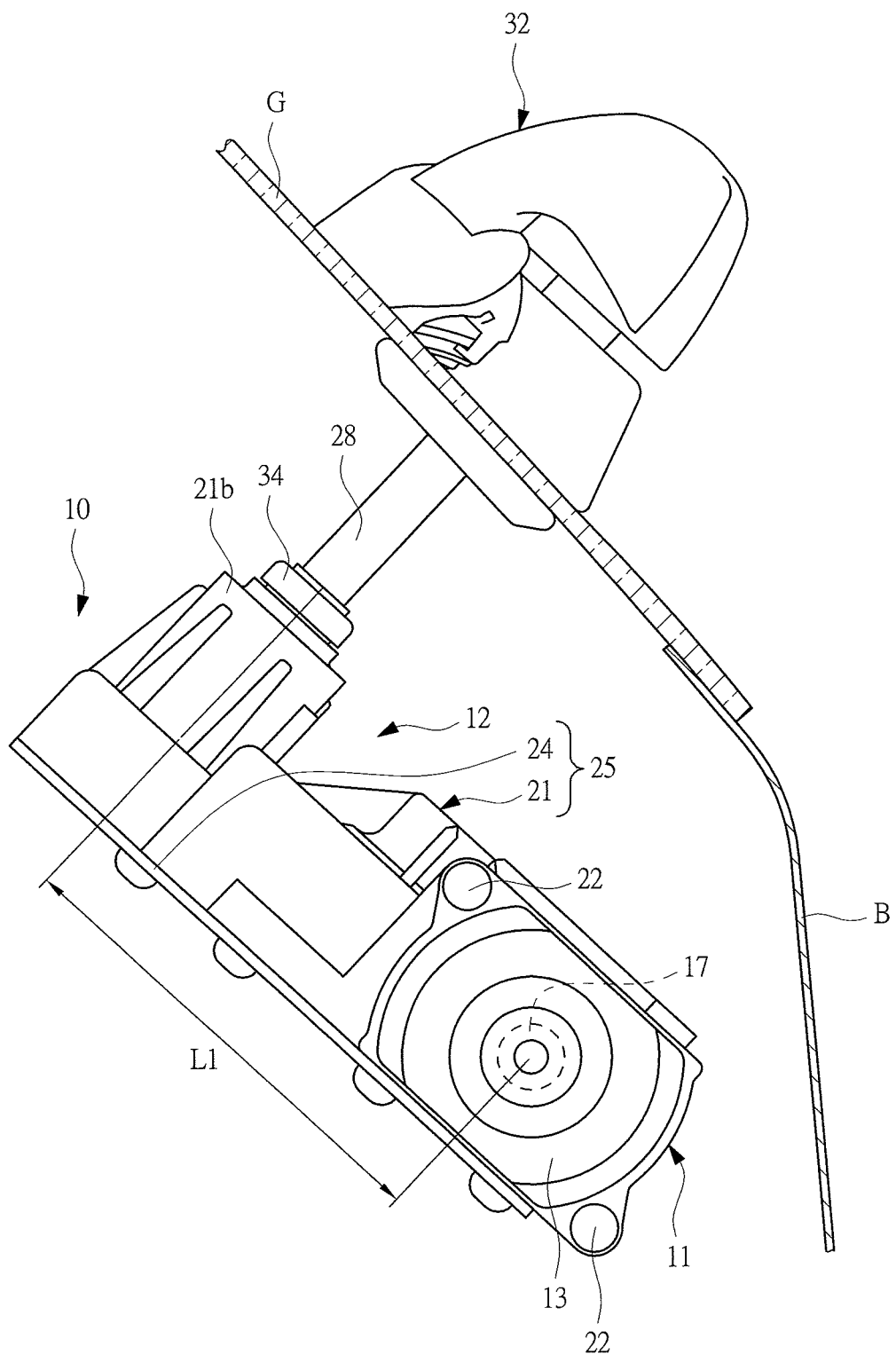
FIG. 3 shows a condition of installation of wiper motor to a vehicle.
Figure 4:
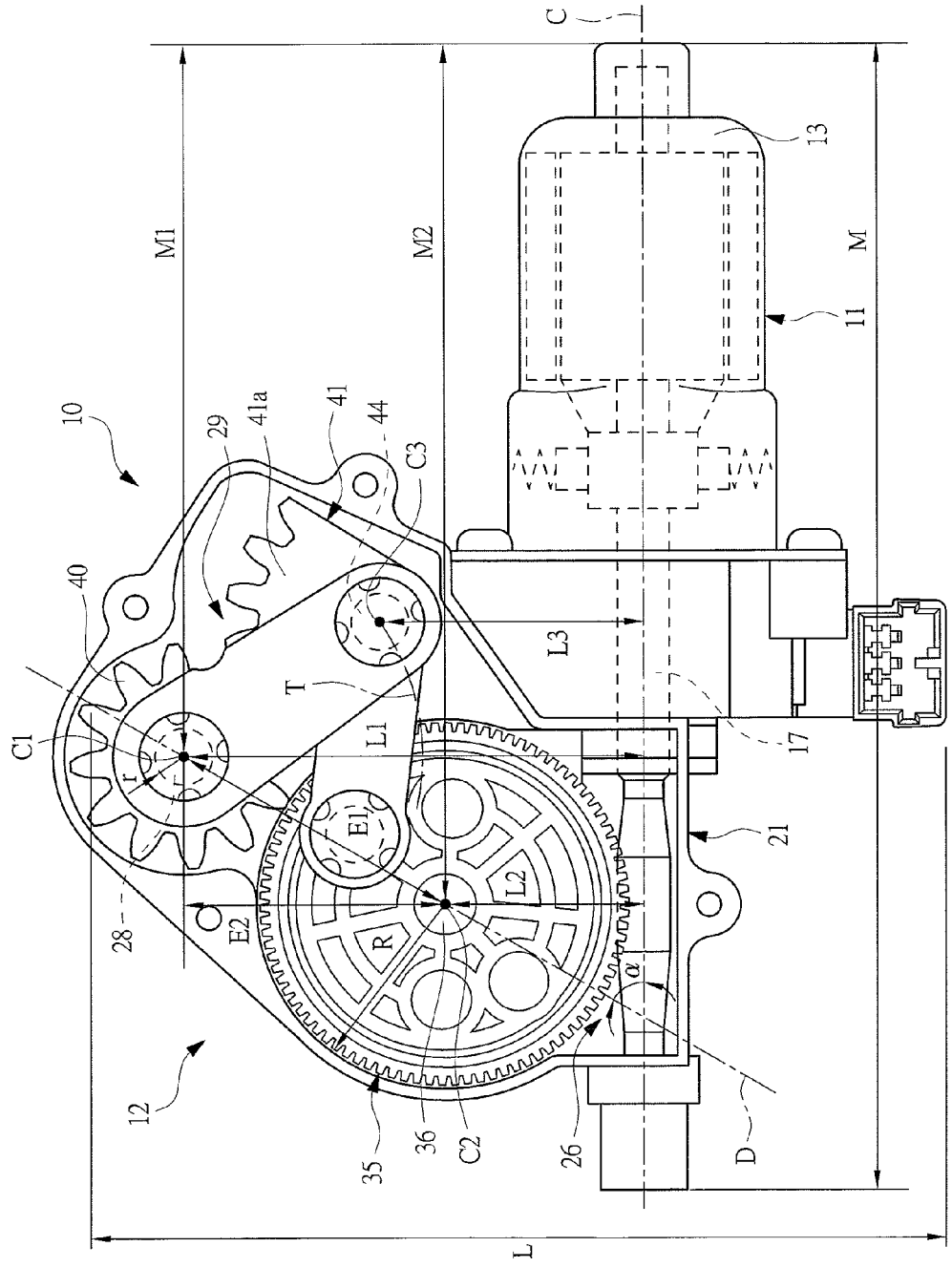
FIG. 4 shows a position of the axial center of the output shaft.
Figure 5:
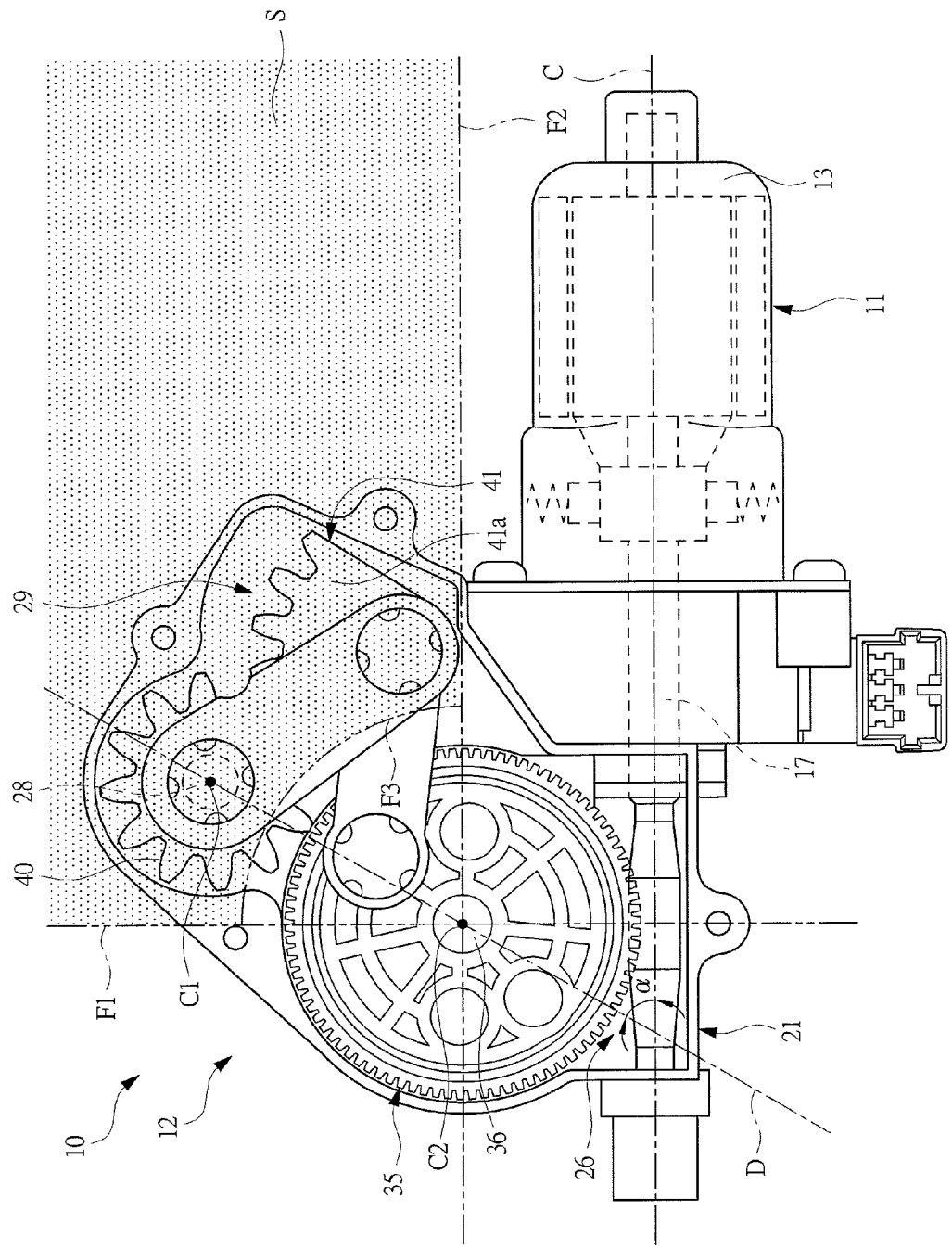
FIG. 5 shows a region on which the axial center of the output shaft is set up.

FIG. 4 is a descriptive view for explaining the position of an axial center of the output shaft, and FIG. 5 is a descriptive view showing a region where the axial center of the output shaft is set up. The upper side of the view in FIG. 3 shows the upper side of the vehicle, and the frontward-backward direction of the view in FIG. 3 shows the rightward-leftward direction (horizontal direction) of the vehicle. The upper side of the view in FIGS. 4 and 5 shows the upper side of the vehicle along the rear window glass G with the wiper motor 10 mounted on the vehicle and the rightward-leftward direction of the view in FIGS. 4 and 5 shows the rightward-leftward direction of the vehicle with the wiper motor mounted on the vehicle.

As shown in FIG. 3, the wiper motor 10 is mounted inside a vehicle body B so that the axial direction of the motor shaft 17 is horizontal and parallel to a rightward-leftward direction of the vehicle body to prevent grease applied to a meshing portion of the speed reduction mechanism 26 from attaching to the commutator 18. When the wiper motor 10 is integrated to the vehicle body, an unshown through-hole to project the distal end of the output shaft 28 to from a rear window glass G is set up at an upper level in the vehicle than the motor body 11. Therefore, when the wiper motor 10 is mounted on the vehicle body so that the axial direction of the motor shaft 17 is horizontal, the position of the output shaft 28 is set up at an upper level on the vehicle than the motor body 11 to the motor body 11 improves layout properties and facilitates mounting the wiper motor 10 on the vehicle body. Therefore, the position of the output shaft 28 is set in the wiper motor 10 based on the following four requirements.

A first requirement to set the position of the output shaft 28 is to radially set up the output shaft 28 outside the worm wheel 35 as shown in FIG. 4. That is, it is designed that a distance E1 between an axial center C1 of the output shaft 28 and an axial center C2 of the worm wheel 35 (an axial center of the rotary shaft 36) is longer than a sum of an outer diameter r of the output shaft 28 and an outer diameter R of the worm wheel 35 (r+R). This prevents the output shaft 28 and the worm wheel 35 from interfering each other, and enables the motion conversion mechanism 29 to convert a rotational motion of the worm wheel 35 into a swinging motion and transmit the swinging motion to the output shaft 28.

A second requirement is to set up the axial center C1 of the output shaft 28 farther from an axis C of the motor shaft 17 than the axial center C2 of the worm wheel 35. That is, it is designed that a perpendicular distance L1 from the axial center C1 of the output shaft 28 to the axis C of the motor shaft 17 is longer than a perpendicular distance L2 from the axial center C2 of the worm wheel 35 to the axis C of the motor shaft 17. As a result, when the wiper motor 10 is set up so that the axial direction of the motor shaft 17 is horizontal, the position of the output shaft 28 can be set up at an upper level in the vehicle than the motor body 11 as compared with the conventional wiper motors.

That is, as compared with such wiper motors as described in JP 2006-151092 and JP2006-94693 of which the axial center of the output shaft is set up nearer to the axis of the motor shaft than the axial center of the worm wheel, since the distance L1 between the output shaft 28 and the motor shaft 17 is large as shown in FIG. 3, the motor body 11 is set up at a lower level in the vehicle than the output shaft 28 penetrating the rear window glass G. Therefore, lapping of the motor body 11 and the rear window glass G over each other (overlapping each other with a predetermined space therebetween) can be suppressed and the wiper motor 10 is easily mounted on the vehicle body.

A third requirement is to set up the axial center C1 of the output shaft 28 on the same side as the axial center C2 of the worm wheel 35 to the axis C of the motor shaft 17. That is, it is designed that a sum of the perpendicular distances L1 and L2 from the axial center C1 of the output shaft 28 and the axial center C2 of the worm wheel 35 to the axis C of the motor shaft 17 (L1+L2) is longer than a distance E2 between the axial center C1 of the output shaft 28 and the axial center C2 of the worm wheel 35 in a direction perpendicular to the axial direction of the motor shaft 17. As a result, compared with such a wiper motor as described in JP2006-94693 of which the axial center of the output shaft is set up on the opposite side of the axis of the motor shaft from the axial center of the worm wheel, since the wiper motor 10 is reduced in dimension L of the wiper motor 10 in a direction perpendicular to the axial direction of the motor shaft 17, the wiper motor 10 can be reduced in size.

A fourth requirement is to set up the axial center C1 of the output shaft 28 nearer to the motor case 13 in the axial direction of the motor shaft 17 than the axial center C2 of the worm wheel 35 is. That is, it is designed that a distance M1 between the axial center C1 of the output shaft 28 and a distal end of the motor case 13 in the axial direction of the motor shaft 17 is shorter than a distance M2 between the axial center C2 of the worm wheel 35 and the distal end of the motor case 13 in the axial direction of the motor shaft 17. As a result, when the wiper motor 10 is set up so that the axial direction of the motor shaft 17 is horizontal, the projection of the motor case 13 can be suppressed to one side in the horizontal direction (one end of the motor shaft 17 in the axial direction) to the position of the output shaft 28 compared with the conventional wiper motors.

That is, compared with a wiper motor shown in FIG. 18 in JP 2006-151092 of which the axial center of the output shaft is set up on the opposite side of the axial center of the worm wheel from the motor case in the axial direction of the motor shaft, since the distance M1 between the output shaft 28 and the distal end of the motor case 13 reduces, the projection of the motor case 13 to one side in the horizontal direction with respect to the output shaft 28 is unnoticeable. Since the wiper motor 10 is easily set up in a limited space inside the vehicle, two types of gear cases to set up the motor case on either side in the horizontal direction as in the conventional manner are not needed. Therefore, the two types of gear cases can be integrated into one type of gear case 25. Furthermore, compared with a wiper motor shown in FIG. 18 in JP 2006-151092 of which the axial center of the output shaft is set up on the opposite side of the axial center of the worm wheel from the motor case in the axial direction of the motor shaft, a dimension M of the wiper motor 10 in the axial direction of the motor shaft 17 reduces, and the size of the wiper motor 10 can reduce.

Based on the above four requirements, the position of the output shaft 28 is arranged so that the axial center C1 of the output shaft 28 is set up in a dotted region S in FIG. 5. That is, it is designed that an angle α between a straight line D connecting the axial center C1 of the output shaft 28 and the axial center C2 of the worm wheel 35 to each other and the axis C of the motor shaft 17 is 0°<α<90°. Here, the angle α shows an angle between the axis C and the straight line D on the side of the axial center C1 of the output shaft 28 to the axis C and on the side of the motor case 13 to the straight line D. The region S is an estranged side from the axis C of the motor shaft 17 and connecting to one axial end side of the motor shaft 17, and FIG. 5 shows part of the region. Additionally, the region S is defined by a straight line F1 perpendicular to the axis C of the motor shaft 17 and through the axial center C2 of the worm wheel 35, a straight line F2 parallel to the axis C of the motor shaft 17 and through the axial center C2 of the worm wheel 35, and an arc F3 having a radius of (r+R) and centering on the axial center C2 of the worm wheel 35, and that excludes these straight lines F1 and F2 and the arc F3.

Thus, since the axial center C1 of the output shaft 28 is set up nearer to the motor case 13 in the axial direction of the motor shaft 17 than the axial center C2 of the worm wheel 35 and farther from the axis C of the motor shaft 17 than the axial center C2 of the worm wheel 35, the layout properties of the wiper motor 10 is improved and the size of the wiper motor 10 can reduce. Therefore, the wiper motor 10 easily set up in a limited space inside the vehicle, and the ease of the mounting workability of the wiper motor 10 improves. Since two types of gear cases 25 are not needed to prepare, the productivity of the wiper motors 10 can improve and the manufacturing cost of the wiper motors 10 reduces.

In the wiper motor 10 shown in FIG. 4, the angle α is set at about 60°, and the axial center C1 of the output shaft 28 is set up farther from the axis C of the motor shaft 17 than an axial center C3 of the gear shaft 44. Then, the sector gear portion 41a of the motion conversion member 41 is swung back and forth at a position adjacent to the pinion gear 40 on a clockwise side in FIG. 4 around the axial center C2 of the worm wheel 35 to the position of the output shaft 28. That is, it is designed that the perpendicular distance L1 from the axial center C1 of the output shaft 28 to the axis C of the motor shaft 17 is longer than the perpendicular distance L3 from the axial center C3 of the gear shaft 44 to the axis C of the motor shaft 17. The position of the axial center C3 of the gear shaft 44 swings back and forth on a movement route T shown in FIG. 4 to the swinging movement of the motion conversion member 41, and it is designed that the perpendicular distance L1 from the axial center C1 of the output shaft 28 is constantly longer than the perpendicular distance L3 from the axial center C3 of the gear shaft 44.

Figure 6:
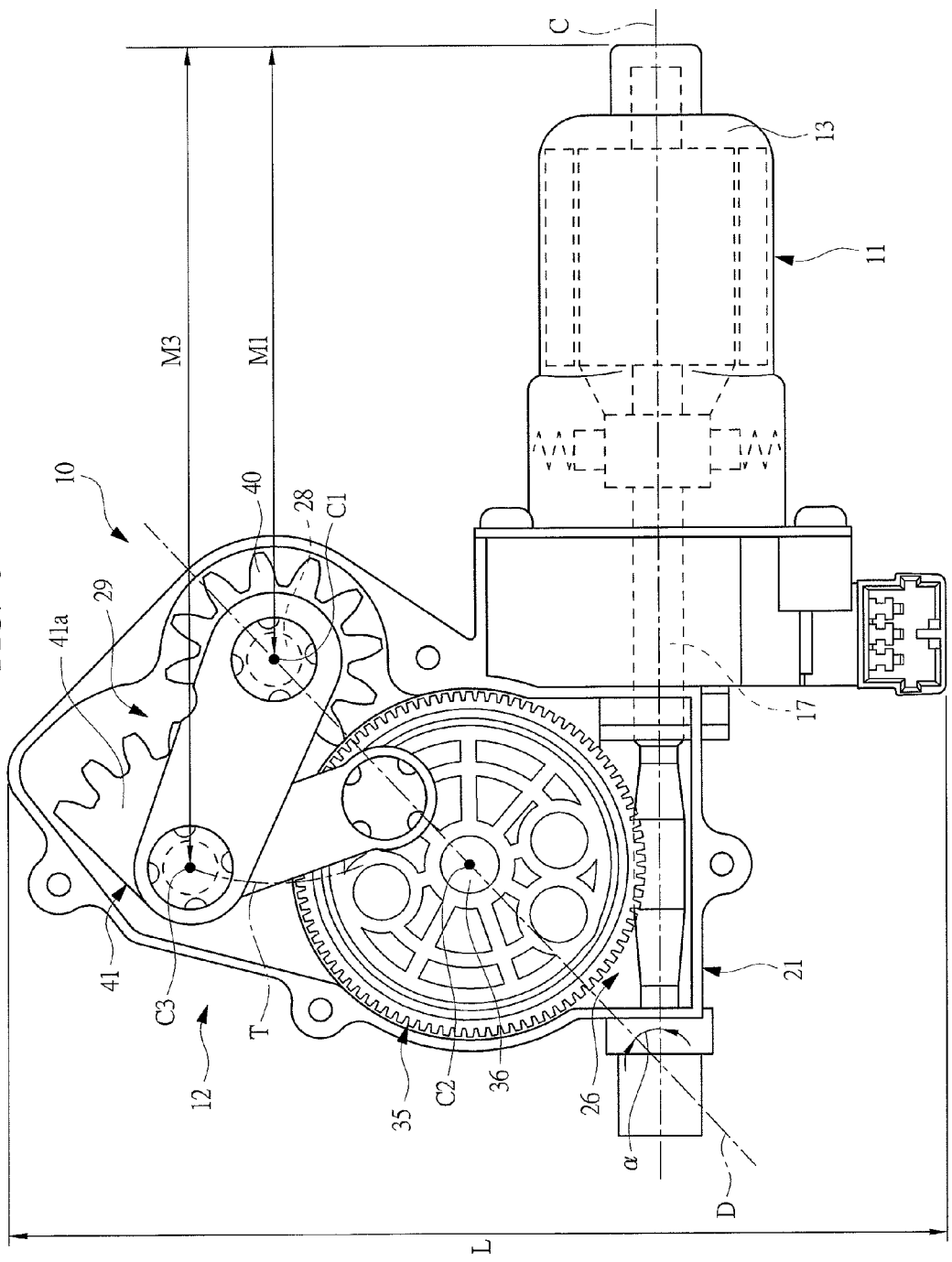
FIG. 6 is a diagram showing a wiper motor of another embodiment of the present invention.

As a result, the dimension L of the wiper motor 10 can reduce with the perpendicular direction L1 from the axial center C11 of the output shaft 28 secured sufficiently, compared with such a wiper motor 10 as shown in FIG. 6 described later of which the sector gear portion 41a of the motion conversion member 41 is swung back and forth at a position adjacent to the output shaft 40 on a counterclockwise side in FIG. 6 around the axial center C2 of the worm wheel 35 to the position of the output shaft 28. That is, a dead space between the pinion gear 40 and the motor body 11 is utilized to dispose the motion conversion member 41 therein and the size of the wiper motor 10 can reduce without degrading the layout properties of the wiper motor 10.

Though the angle α is set at about 60° in the above embodiment, the angle α as described above can be changed optionally within the range of 0°<α<90°. In the above embodiment, the sector gear portion 41a of the motion conversion member 41 is set up on the side of the motor case 13 to the straight line D connecting the axial center C1 of the output shaft 28 and the axial center C2 of the worm wheel 35. However, the sector gear portion 41a of the motion conversion member 41 may be set up on the opposite side of the straight line D from the motor case 13. That is, it may be designed that conversion member 41 is symmetrical to the straight line D.

FIG. 6 is a plan view showing a wiper motor of another embodiment of the present invention. In the wiper motor 10 shown in FIG. 6, the angle α is set at about 45°, and the axial center C1 of the output shaft 28 is set up nearer to the motor case 13 in the axial direction of the motor shaft 17 than the axial center C3 of the gear shaft 44. Then, the sector gear portion 41a of the motion conversion member 41 is swung back and forth at a position adjacent to the pinion gear 40 on the counterclockwise side in FIG. 6 around the axial center C2 of the worm wheel 35 to the position of the output shaft 28. That is, it is designed that the distance M1 between the axial center C1 of the output shaft 28 and the distal end of the motor case 13 in the axial direction of the motor shaft 17 is shorter than a distance M3 between the axial center C3 of the gear shaft 44 and the distal end of the motor case 13 in the axial direction of the motor shaft 17. The position of the axial center C3 of the gear shaft 44 swings back and forth on the movement route T shown in FIG. 6 to the swinging movement of the motion conversion member 41. However, it is designed that the distance M1 from the axial center C1 of the output shaft 28 to the distal end of the motor case 13 is constantly shorter than the distance M3 from the axial center C3 of the gear shaft 44 to the distal end of the motor case 13.

As a result, the distance M1 from the axial center C1 of the output shaft 28 to the distal end of the motor case 13 can be shorter compared with such a wiper motor 10 as shown in FIG. 4 of which the sector gear portion 41a of the motion conversion member 41 is swung back and forth at a position adjacent to the output gear 40 on the clockwise side in FIG. 4 around the axial center C2 of the worm wheel 35 to the position of the output shaft 28. Therefore, the projection of the motor case 13 can be suppressed to one side in the horizontal direction to the position of the output shaft 28.

The present invention is not limited to the above embodiments, and can be modified variously without departing from the scope of the present invention. For example, the motion conversion mechanism 29 is not limited to the differential gear type, and may be a link type. In addition, the motor body 11 is not limited to the brushed motor, and may be another electric motor such as a brushless motor. Furthermore, the wiper motor 10 of the present invention is not limited to one used in a rear window device of a vehicle such as an automobile, and may be used in a wiper device that an aircraft or a ship is provided with.

A wiper motor is applied to driving a wiper members forming wiper device set up in a vehicle such as an automobile and to wiping window glasses.

While the present invention has been illustrated and described with respect to a particular embodiment thereof, it should be appreciated by those of ordinary skill in the art that various modifications to this invention may be made without departing from the spirit and scope of the present.

What is claimed is:

1. A wiper motor comprising:
 a yoke rotatably supporting one axial end of a motor shaft;
 a speed reduction mechanism for reducing the speed of rotation of the motor shaft, the speed reduction mechanism comprising a worm rotated by the motor shaft and a worm wheel formed into a substantially disk shape and meshing with the worm, the worm adapted to continuously rotate the worm wheel in a single direction;
 a gear frame in which the speed reduction mechanism is housed;
 an output shaft rotatably supported by the gear frame, the output shaft extending parallel to an axial direction of the worm wheel, an axial center of the output shaft being located closer to the yoke than an axial center of the worm wheel in an axial direction of the motor shaft, closer to the worm wheel than an opening end face of the yoke, and away from the axial center of the worm wheel in a direction away from an axis of the motor shaft; and
 a motion conversion mechanism contained in the gear frame, and converting a continuous rotational motion of the worm wheel in the single direction into a swinging motion and transmitting the swinging motion to the output shaft.

2. The wiper motor according to claim 1, wherein the output shaft is radially set up outside the worm wheel.

3. The wiper motor according to claim 1, wherein the axial center of the output shaft is set up on the same side as the axial center of the worm wheel to the axis of the motor shaft.

4. The wiper motor according to claim 1, wherein the motion conversion mechanism comprises a pinion gear fixed to a proximal end of the output shaft and integrally rotating with the output shaft; a motion conversion member comprising a sector gear portion meshing with the pinion gear and being pivotally connected to the worm wheel at a position radially deviating from the axial center of the worm wheel; and a retaining plate swingably connecting a gear shaft set up at an axial center of the sector gear portion and the output shaft.

5. The wiper motor according to claim 4, wherein the axial center of the output shaft is set up farther from the axis of the motor shaft than an axial center of the gear shaft.

6. The wiper motor according to claim 4, wherein the axial center of the output shaft is set up nearer to the yoke in the axial direction of the motor shaft than the axial center of the gear shaft.

* * * * *